United States Patent
Crane et al.

(10) Patent No.: US 10,063,846 B2
(45) Date of Patent: *Aug. 28, 2018

(54) SELECTIVE ILLUMINATION OF A REGION WITHIN A FIELD OF VIEW

(71) Applicant: Microsoft Technology Licensing, LLC, Redmond, WA (US)

(72) Inventors: Randall T. Crane, Fort Collins, CO (US); David D. Bohn, Fort Collins, CO (US); Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,426

(22) Filed: Jun. 30, 2016

(65) Prior Publication Data

US 2016/0316194 A1    Oct. 27, 2016

Related U.S. Application Data (63) Continuation of application No. 13/525,903, filed on Jun. 18, 2012, now Pat. No. 9,398,229.

(51) Int. Cl.
*H04N 9/47* (2006.01)
*H04N 13/04* (2006.01)
(Continued)

(52) U.S. Cl.
CPC ....... *H04N 13/044* (2013.01); *G02B 27/0093* (2013.01); *G02B 27/017* (2013.01); *G02B 27/0172* (2013.01); *G06F 3/005* (2013.01); *G06F 3/017* (2013.01); *G06F 3/0325* (2013.01); *H04N 5/2354* (2013.01); *H04N 13/0468* (2013.01); *H04N 13/0497* (2013.01); *G02B 2027/0118* (2013.01); *G02B 2027/0138* (2013.01); *G02B 2027/0178* (2013.01);
(Continued)

(58) Field of Classification Search
CPC .... G02B 2027/0138; G02B 2027/0118; G02B 2027/0178; G06F 3/017; H04N 5/2354; G01N 15/06
USPC ................. 351/205; 359/239, 629; 235/454; 345/156; 348/145, 169
See application file for complete search history.

(56) References Cited

U.S. PATENT DOCUMENTS 5,546,156 A    8/1996    McIntyre
5,920,348 A    7/1999    Ejima
(Continued)

OTHER PUBLICATIONS

"Notice of Allowance", U.S. Appl. No. 13/525,772, dated Mar. 2, 2017, 7 pages.
(Continued)

*Primary Examiner* — Gims S Philippe (57) ABSTRACT

In embodiments of selective illumination of a region within a field of view, an illumination system includes light sources implemented for selective illumination of a target within a field of view of an imaging system. The illumination system also includes optics that can be positioned to direct light that is generated by a subset of the light sources to illuminate a region within the field of view. An imaging application can activate the subset of the light sources and position the optics to illuminate the region within the field of view that includes the target of the selective illumination.

20 Claims, 9 Drawing Sheets

(51) Int. Cl.
  *H04N 5/235* (2006.01)
  *G02B 27/01* (2006.01)
  *G06F 3/00* (2006.01)
  *G06F 3/01* (2006.01)
  *G06F 3/03* (2006.01)
  *G02B 27/00* (2006.01)

(52) U.S. Cl.
  CPC .......... *G02B 2027/0187* (2013.01); *G09G 2320/0261* (2013.01); *G09G 2354/00* (2013.01)

(56) References Cited

U.S. PATENT DOCUMENTS

| | | |
|---|---|---|
| 6,282,308 B1 | 8/2001 | Cossette |
| 7,009,652 B1 | 3/2006 | Tanida et al. |
| 7,104,455 B2 | 9/2006 | Tsikos |
| 8,774,517 B1 | 7/2014 | Khosla et al. |
| 9,398,229 B2 | 7/2016 | Crane et al. |
| 9,674,436 B2 | 6/2017 | Crane et al. |
| 2001/0055025 A1 | 12/2001 | Deering et al. |
| 2005/0057687 A1 | 3/2005 | Irani et al. |
| 2006/0180746 A1 | 8/2006 | Muenter et al. |
| 2006/0239336 A1 | 10/2006 | Baraniuk et al. |
| 2008/0036728 A1 | 2/2008 | Takagi |
| 2008/0106794 A1* | 5/2008 | Messina ............. G01N 21/8806 359/629 |
| 2008/0198225 A1 | 8/2008 | Gal et al. |
| 2008/0252728 A1* | 10/2008 | Landau ................ G01S 17/107 348/145 |
| 2009/0046338 A1 | 2/2009 | Zimmerman et al. |
| 2009/0072124 A1 | 3/2009 | Schofield et al. |
| 2009/0322795 A1 | 12/2009 | Vasquez et al. |
| 2010/0092031 A1 | 4/2010 | Bergeron et al. |
| 2010/0141802 A1 | 6/2010 | Knight et al. |
| 2010/0245588 A1 | 9/2010 | Waehner et al. |
| 2010/0322479 A1 | 12/2010 | Cleveland |
| 2011/0074855 A1 | 3/2011 | Casaldaliga et al. |
| 2011/0103410 A1 | 5/2011 | Hutchin |
| 2011/0128393 A1 | 6/2011 | Tavi et al. |
| 2011/0135208 A1 | 6/2011 | Atanassov et al. |
| 2011/0187878 A1 | 8/2011 | Mor et al. |
| 2011/0193969 A1* | 8/2011 | Tsai ..................... G06F 3/0428 348/169 |
| 2011/0212751 A1 | 9/2011 | Havens et al. |
| 2011/0221656 A1 | 9/2011 | Haddick et al. |
| 2012/0002071 A1 | 1/2012 | Nishiyama |
| 2012/0105868 A1 | 5/2012 | Nomura et al. |
| 2012/0294478 A1 | 11/2012 | Publicover et al. |
| 2013/0335302 A1 | 12/2013 | Crane |
| 2013/0335546 A1 | 12/2013 | Crane |
| 2014/0002352 A1 | 1/2014 | Jacob et al. |
| 2017/0276588 A1* | 9/2017 | Knox ..................... G01N 15/06 |

OTHER PUBLICATIONS

"Final Office Action", U.S. Appl. No. 13/525,772, dated Jun. 28, 2016, 22 pages.
"Final Office Action", U.S. Appl. No. 13/525,772, dated Jul. 29, 2015, 22 pages.
"Final Office Action", U.S. Appl. No. 13/525,772, dated Dec. 4, 2014, 19 pages.
"Final Office Action", U.S. Appl. No. 13/525,903, dated Feb. 23, 2015, 19 pages.
"Final Office Action", U.S. Appl. No. 13/525,903, dated Dec. 8, 2015, 17 pages.
"Non-Final Office Action", U.S. Appl. No. 13/525,772, dated Jan. 4, 2016, 20 pages.
"Non-Final Office Action", U.S. Appl. No. 13/525,772, dated Mar. 31, 2015, 20 pages.
"Non-Final Office Action", U.S. Appl. No. 13/525,772, dated Sep. 24, 2014, 13 pages.
"Non-Final Office Action", U.S. Appl. No. 13/525,903, dated Jun. 3, 2015, 16 pages.
"Non-Final Office Action", U.S. Appl. No. 13/525,903, dated Sep. 23, 2014, 13 pages.
"Notice of Allowance", U.S. Appl. No. 13/525,903, dated Mar. 16, 2016, 5 pages.
Bland"Astronomical Imaging: 3D spectrophotometric imaging opens a new window into the cosmos", Retrieved at <<http://www.laserfocusworld.com/articles/print/volume-46/issue-12/features/astronomical-imaging-3d-spectrophotometric-imaging-opens-a-new-window-into-the-cosmos.html>, Dec. 1, 2010, 6 pages.
Kim,"Energy-Aware High Resolution Image Acquisition via Heterogeneous Image Sensors", IEEE Journal of Selected Topics in Signal Processing—Retrieved at <<http://ieeexplore.ieee.org/stamp/stamp.jsp?tp=&arnumber=4629873>>, Sep. 23, 2008, pp. 526-537.
Kortum,"Implementation of a Foveated Image Coding System for Image Bandwidth Reduction", In Proceedings: SPIE 2657, Human Vision and Electronic Imaging, 350, Apr. 22, 1996, 13 pages.

\* cited by examiner

SELECTIVE ILLUMINATION OF A REGION WITHIN A FIELD OF VIEW

RELATED APPLICATION

This application is a continuation of and claims priority to U.S. patent application Ser. No. 13/525,903, filed Jun. 18, 2012 entitled "Selective Illumination of a Region within a Field of View", the disclosure of which is incorporated by reference herein in its entirety.

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device (HMD) that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As emerging technologies, there are many challenges and design constraints with virtual and augmented reality, from generation of the virtual objects and images so that they appear realistic in a real environment, to developing the optics small and precise enough for implementation with a wearable display device.

A wearable display device, such as a head-mounted display (HMD), for virtual or augmented reality typically has cameras and an illumination source that generates infrared (IR) or near-IR light, which is imaged by the cameras to determine device orientation, object positioning, and for system calibrations. As a portable type of device, a wearable display device is typically battery powered and an illumination source can utilize excessive amounts of power, particularly when a wide field of view is illuminated. Further, the cameras of a wearable display device are, for the most part, always on and can be a consistent drain of battery power. The power consumption of a camera is a direct function of the size of its imaging array, and a larger imaging array will draw more current and use more power than a smaller imaging array.

SUMMARY

This Summary introduces simplified concepts of selective illumination, and the concepts are further described below in the Detailed Description and/or shown in the Figures. This Summary should not be considered to describe essential features of the claimed subject matter, nor used to determine or limit the scope of the claimed subject matter.

Selective illumination is described. In embodiments, an illumination system includes light sources implemented for selective illumination of a target within a field of view of an imaging system. The illumination system also includes optics that can be positioned to direct light that is generated by a subset of the light sources to illuminate a region within the field of view. An imaging application can activate the subset of the light sources and position the optics to illuminate the region within the field of view that includes the target of the selective illumination.

In other embodiments, the imaging application can deactivate (or not activate) the light sources that do not illuminate the region within the field of view that includes the target to conserve power that would otherwise be utilized by the light sources to generate additional light. The imaging application can also activate all of the light sources at less than full power when the target of the selective illumination approximately encompasses the field of view at a position near the imaging system, or activate the subset of the light sources at the full power when the target of the selective illumination is positioned in the region within the field of view away from the imaging system. The imaging application is also implemented to transition activation from of the subset of the light sources to an additional subset of the light sources to maintain the selective illumination of the target as the target moves from the region to an adjacent region within the field of view.

BRIEF DESCRIPTION OF THE DRAWINGS

Embodiments of selective illumination are described with reference to the following Figures. The same numbers may be used throughout to reference like features and components that are shown in the Figures.

DETAILED DESCRIPTION

Embodiments of selective illumination are described. As noted above, a wearable display device is typically battery powered and an illumination source can utilize excessive amounts of power, particularly when a wide field of view is illuminated. Further, the cameras of a wearable display device are, for the most part, always on and can be a consistent drain of battery power. Selective illumination can be implemented to activate selected light sources of an illumination system to illuminate a region within a field of view. The other light sources of the illumination system are deactivated (or are not activated) to conserve power that would otherwise be utilized to generate additional light. Selective imaging can be implemented to activate the zone of an imaging sensor to capture the image of a target in a region within the field of view. The other zones of the imaging sensor are deactivated (or are not activated) to conserve power that would otherwise be utilized to image and process the full field of view. An imaging application is implemented to track the movement of a target based on the captured and processed images. Selectively illuminating and imaging a region within the field of view can significantly reduce the battery power used to illuminate and image a target in the region of the field of view.

Embodiments of selective illumination can be implemented independent of selective imaging. Similarly, embodiments of selective imaging can be implemented independent of selective illumination. Alternatively, embodiments of both selective illumination and selective imaging can be implemented together to conserve power, such as in a battery-powered device.

While features and concepts of selective illumination can be implemented in any number of different devices, systems, environments, and/or configurations, embodiments of selective illumination are described in the context of the following example devices, systems, and methods.

Figure 1:
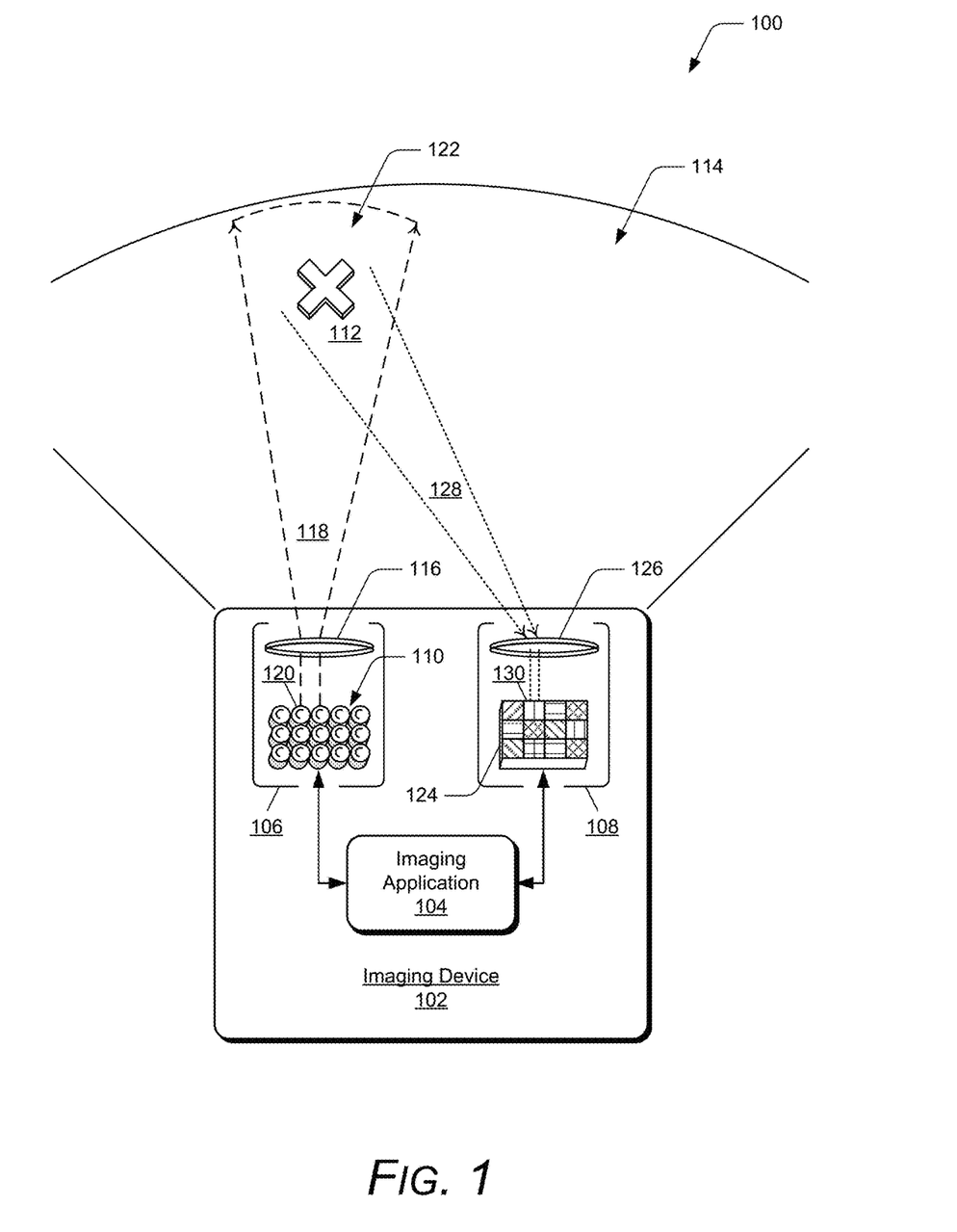
FIG. 1 illustrates an example system that includes an illumination system and an imaging system in accordance with one or more embodiments of selective illumination.

FIG. 1 illustrates an example system 100 in which various embodiments of selective illumination and/or selective imaging can be implemented. An imaging device 102 includes an imaging application 104, an illumination system 106, and an imaging system 108. The imaging device 102 may be implemented as part of a gaming system, or as part of a wearable display device, such as any type of glasses or head-mounted display (HMD) for virtual and/or augmented reality imaging as described with reference to FIG. 6. A wearable display device can include a controller and/or the imaging application 104, such as a software application, to implement embodiments of selective illumination as described herein. Examples of controller units that can implement an imaging application for a wearable display device are also described with reference to FIG. 6. The illumination system 106 and the imaging system 108 can be implemented as part of the sensors and cameras for head-tracking, hand-tracking, eye-tracking, world recognition and orientation, proximity sensors, and/or for calibration of a gaming system or wearable display device.

The illumination system 106 includes light sources 110 that are implemented for selective illumination of a target 112 within a field of view 114 of the imaging system 108. The light sources may be implemented as an array of light emitting diodes (LEDs), an array of lasers, a vertical cavity surface emitting laser (VCSEL) array, and/or with any other array of light sources that can be selectively activated for selective illumination. In implementations, the light sources emit a non-visible, near infra-red light that illuminates a target. The illumination system also includes optics 116 that can be positioned to direct light 118 that is generated by a subset 120 of the light sources to illuminate a region 122 within the field of view. The optics 116 may be implemented as a micro-electro-mechanical (MEMs) scanning mirror, a liquid crystal (LC) optic for beam steering, a Switchable Bragg Grating (SBG), and/or with any other types of optics or combination of optics (e.g., collimation optics) that can be implemented for binary, variable, and/or single- or multi-dimension light control.

In embodiments of selective illumination, the imaging application 104 is implemented to activate the subset 120 of the light sources 110 and position the optics 116 to illuminate the region 122 within the field of view 114 that includes the target 112 of the selective illumination. Although the light sources can all be activated to illuminate the entire field of view (e.g., approximately 180 degrees), just the smaller region (e.g., approximately 25 degrees, for example) can be illuminated to conserve power. The imaging application is implemented to deactivate (or not activate) the other light sources that do not illuminate the region within the field of view that includes the target to conserve power that would otherwise be utilized by the light sources to generate additional light. For a portable type of device, such as a wearable display device that is typically battery powered, selectively illuminating only the narrower region 122 within the field of view 114 can significantly reduce battery power use.

In other embodiments, the imaging application 104 can activate all of the light sources 110 of the illumination system 106 at less than full power or at full power to initially determine a position of the target 112 in the region 122 within the field of view 114. Once the target position has been determined, the imaging application can then activate the subset 120 of the light sources at the full power, and deactivate the other light sources that do not illuminate the region within the field of view that includes the target. Additionally, the imaging application 104 can activate all of the light sources 110 of the illumination system 106 at less than full power when a target of the selective illumination approximately encompasses the entire field of view at a position near the imaging device. For example, the target may be a hand of a user that wears a head-mounted display device, and the user may move or position his or her hand close to the imaging device, which would, for the most part, encompass the entire field of view.

The imaging system 108 includes an imaging sensor 124 (also referred to as an imaging array) that captures an image of the target 112 within the field of view 114 of the imaging system. In embodiments, the imaging sensor 124 is divided into zones of pixel arrays, and one or more of the zones of the imaging sensor can be selectively activated and/or deactivated for selective imaging. Although shown as a pattern of rectangular zones, the zones of the imaging sensor may be implemented as any number and shape of pixel arrays. Further, a larger array camera can be emulated with selective imaging control of a smaller imaging sensor, such as an imaging sensor having quadrants of pixel arrays. Additionally, each zone of the imaging sensor can correspond to a different region within the field of view of the imaging system, or a zone may correspond to more than one region within the field of view of the imaging system. The imaging system also includes optics 126 that can be positioned to direct light 128 of the image at a selected zone 130 of the imaging sensor. The optics may be implemented as a micro-electro-mechanical (MEMs) scanning mirror, a liquid crystal (LC) optic for beam steering, a Switchable Bragg Grating (SBG), and/or with any other types of optics or combination of optics (e.g., collimation optics) that can be implemented for binary, variable, and/or single- or multi-dimension light control.

In embodiments of selective imaging, the imaging application 104 is implemented to activate the selected zone 130 of the imaging sensor and position the optics 126 to direct the light 128 at the zone of the imaging sensor to capture the image of the target 112. Additionally, the imaging application is implemented to deactivate (or not activate) the other zones of the imaging sensor that are not utilized for selective imaging to conserve power that would otherwise be utilized to image and process the full field of view. For a portable type of device, such as a wearable display device that is typically battery powered, selectively imaging only the narrower region 122 within the field of view 114 can significantly reduce battery power used to capture and process the image of a target.

Figure 2:
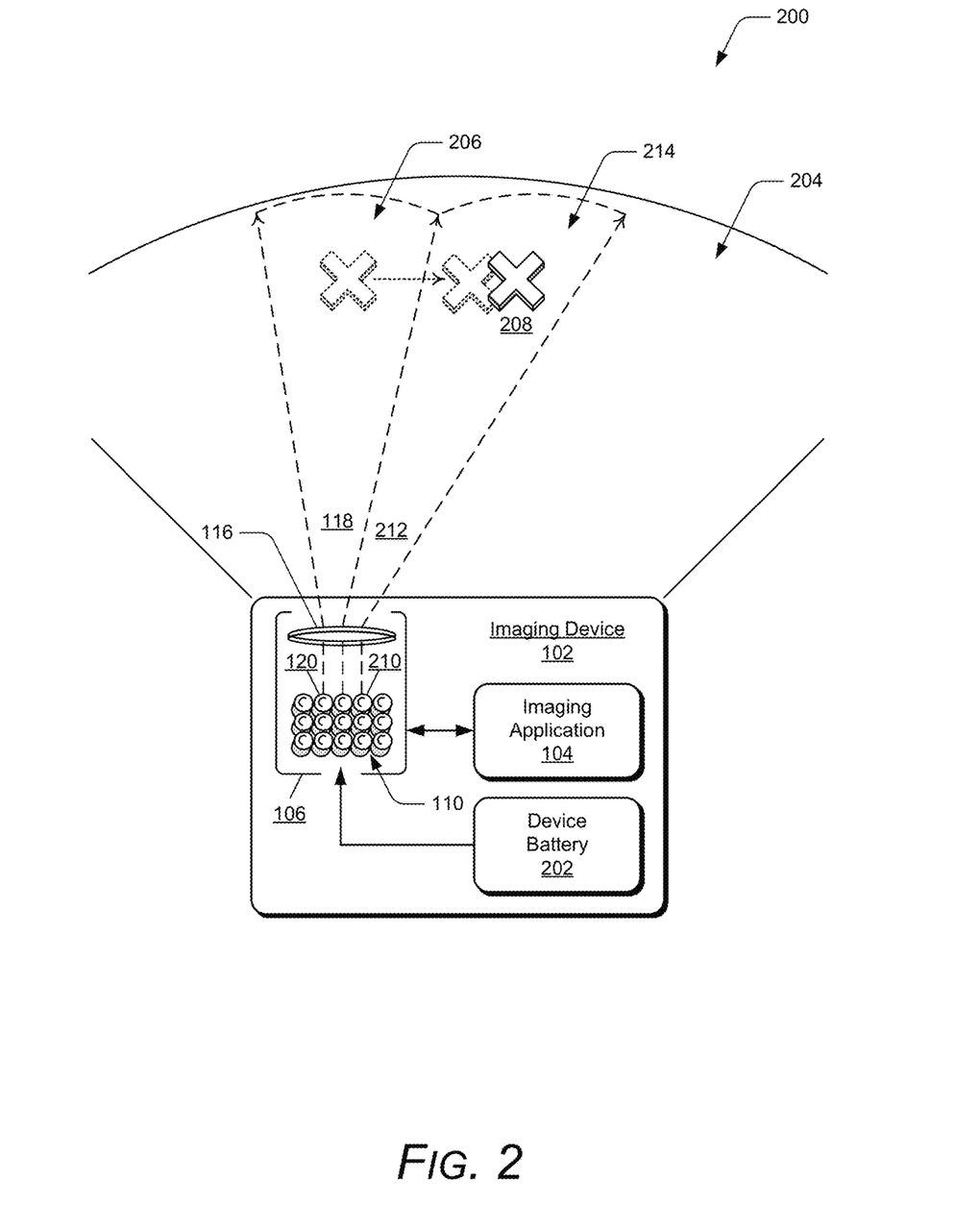
FIG. 2 illustrates an example of selective illumination in accordance with one or more embodiments.

FIG. 2 illustrates an example 200 of selective illumination in accordance with the embodiments described herein. As described with reference to FIG. 1, the imaging device 102 includes the imaging application 104 and a device battery 202 that powers the light sources 110 of the illumination system 106. The imaging application is implemented to control activation of one or more subsets of the light sources 110 and position the optics 116 to direct the light that illuminates one or more regions within a field of view 204. For example, the imaging application 104 can activate the subset 120 of the light sources 110 and position the optics 116 to direct the light 118 to illuminate a region 206 within the field of view 204 that initially includes a target 208 of the selective illumination.

The imaging application 104 can then transition activation from the initial subset 120 of the light sources to an additional subset 210 of the light sources to maintain the selective illumination of the target 208 with light 212 that is directed by the optics 116 as the target moves from the region 206 to an adjacent region 214 within the field of view 204. When regions within the field of view overlap, such as if the region 206 and the adjacent region 214 partially overlap, the imaging application can activate one or more of the light sources 110 as part of the initial subset 120 and as part of the additional subset 210 of the light sources to maintain the selective illumination as the target 208 moves between the partially overlapping region and adjacent region.

Figure 3:
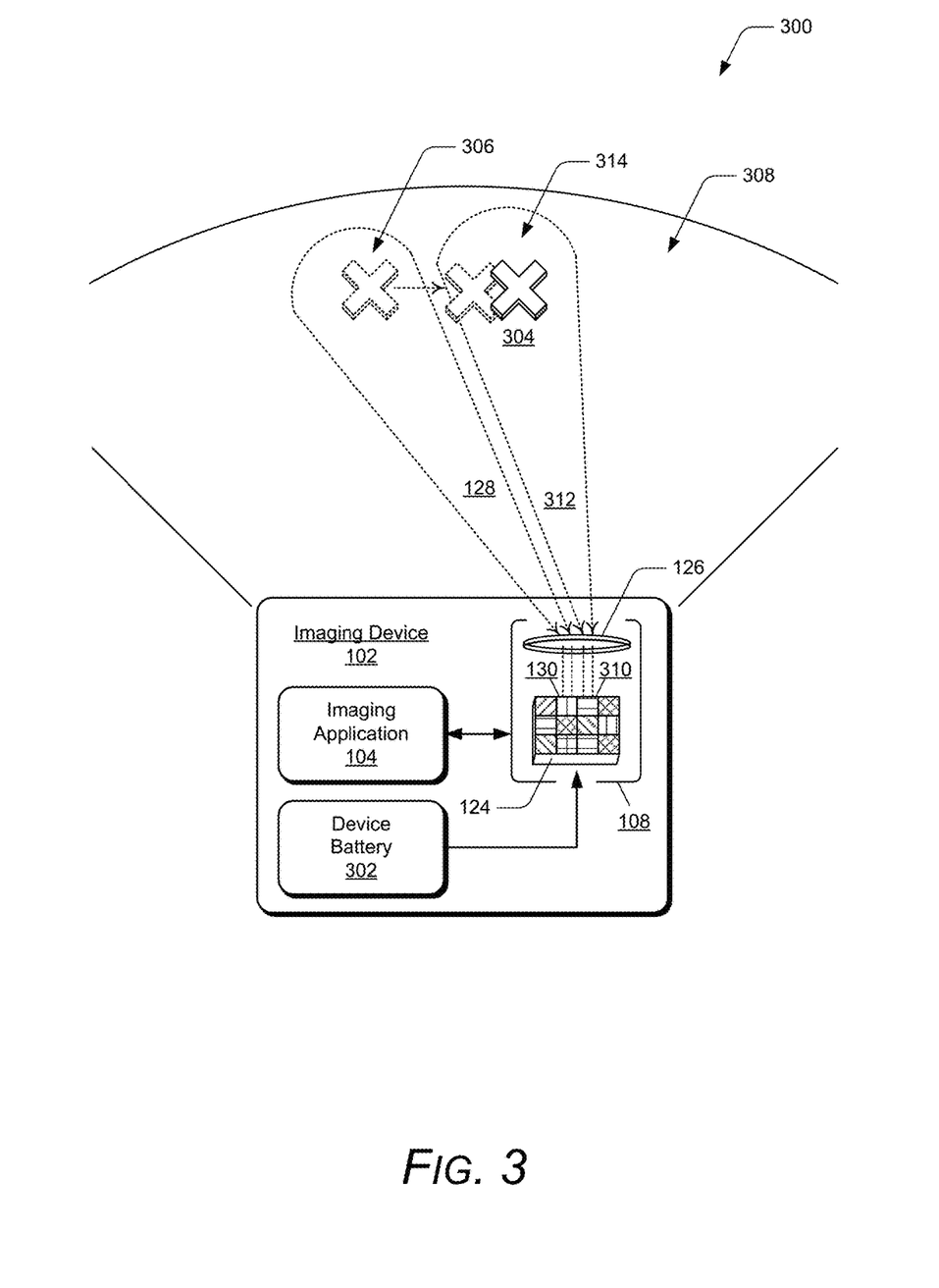
FIG. 3 illustrates an example of selective imaging in accordance with one or more embodiments.

FIG. 3 illustrates an example 300 of selective imaging in accordance with the embodiments described herein. As described with reference to FIG. 1, the imaging device 102 includes the imaging application 104 and a device battery 302 that powers the imaging sensor 124 of the imaging system 108. The imaging application is implemented to control activation of one or more zones of the imaging sensor 124 and position the optics 126 to direct light at the zones of the imaging sensor to capture the image of a target. For example, the imaging application 104 can activate the selected zone 130 of the imaging sensor 124 and position the optics 126 to direct the light 128 to capture the image of a target 304 that is initially positioned in a region 306 within a field of view 308.

The imaging application 104 is implemented to track movement of the target 304 to determine a next position of the target. The imaging application can then transition activation from the initial zone 130 of the imaging sensor 124 to an additional zone 310 of the imaging sensor, and position the optics 126 to direct the light 312, to maintain the selective imaging of the target as the target moves from the position in region 306 to the next position in region 314 within the field of view 308. As the target transitions between positions in the overall field of view, the imaging application can activate more than one of the zones of the imaging sensor to maintain the selective imaging of the target.

Figure 4:
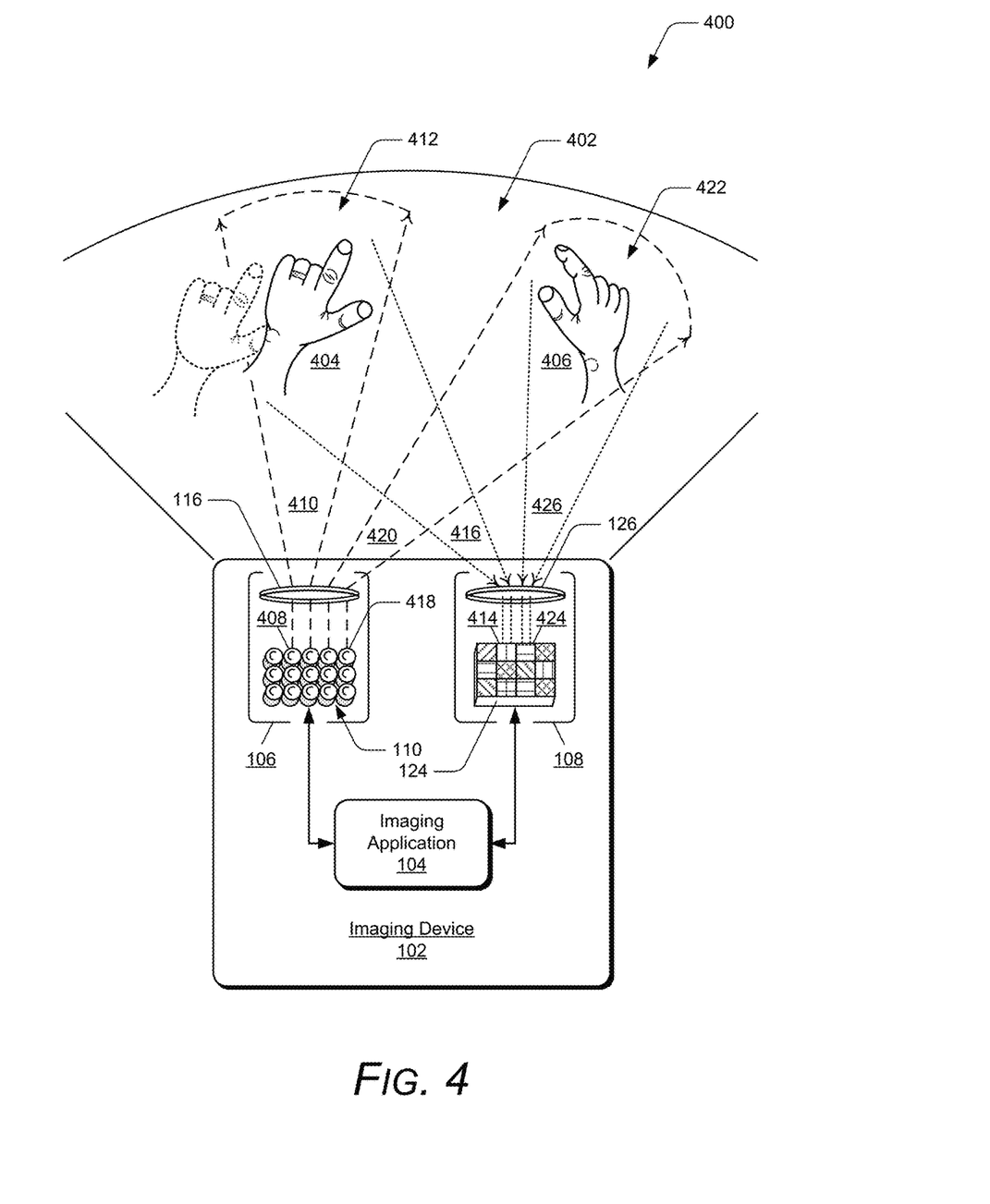
FIG. 4 further illustrates examples of selective illumination and selective imaging in accordance with one or more embodiments.

FIG. 4 further illustrates examples 400 of selective illumination and selective imaging in accordance with the embodiments described herein. As described with reference to FIG. 1, the imaging device 102 includes the imaging application 104 that is implemented to control the illumination system 106 and the imaging system 108. The imaging application is implemented to control activation of one or more subsets of the light sources 110 and position the optics 116 to direct the light that illuminates targets in one or more regions within a field of view 402. In this example, the targets of selective illumination are the left hand 404 and right hand 406 of a user of the device, such as a gaming device or a wearable display device. The imaging application is also implemented to control activation of one or more zones of the imaging sensor 124 and position the optics 126 to direct light at the zones of the imaging sensor to capture images of the hands that are positioned in the one or more regions within the field of view 402. In implementations, the imaging application tracks the movement of the hands (e.g., a target) based on the captured and processed images.

In this example 400, a first subset 408 of the light sources 110 in the illumination system 106 are activated and the optics 116 positioned to direct light 410 to illuminate a first region 412 within the field of view 402 to selectively illuminate the left hand 404 of the user. Additionally, a first zone 414 of the imaging sensor 124 in the imaging system 108 is activated and the optics 126 positioned to direct light 416 to selectively image the left hand 404 that is positioned in the selectively illuminated region 412 within the field of view 402.

Similarly, a second subset 418 of the light sources 110 in the illumination system 106 are activated and the optics 116 positioned to direct light 420 to illuminate a second region 422 within the field of view 402 to selectively illuminate the right hand 406 of the user. Additionally, a second zone 424 of the imaging sensor 124 in the imaging system 108 is activated and the optics 126 positioned to direct light 426 to selectively image the right hand 406 that is positioned in the selectively illuminated region 422 within the field of view 402. In embodiments, the imaging application 104 is also implemented to determine the next position of a target hand based in part on eye-tracking data that indicates the user is looking at the next position where the target hand will move.

Figure 5:
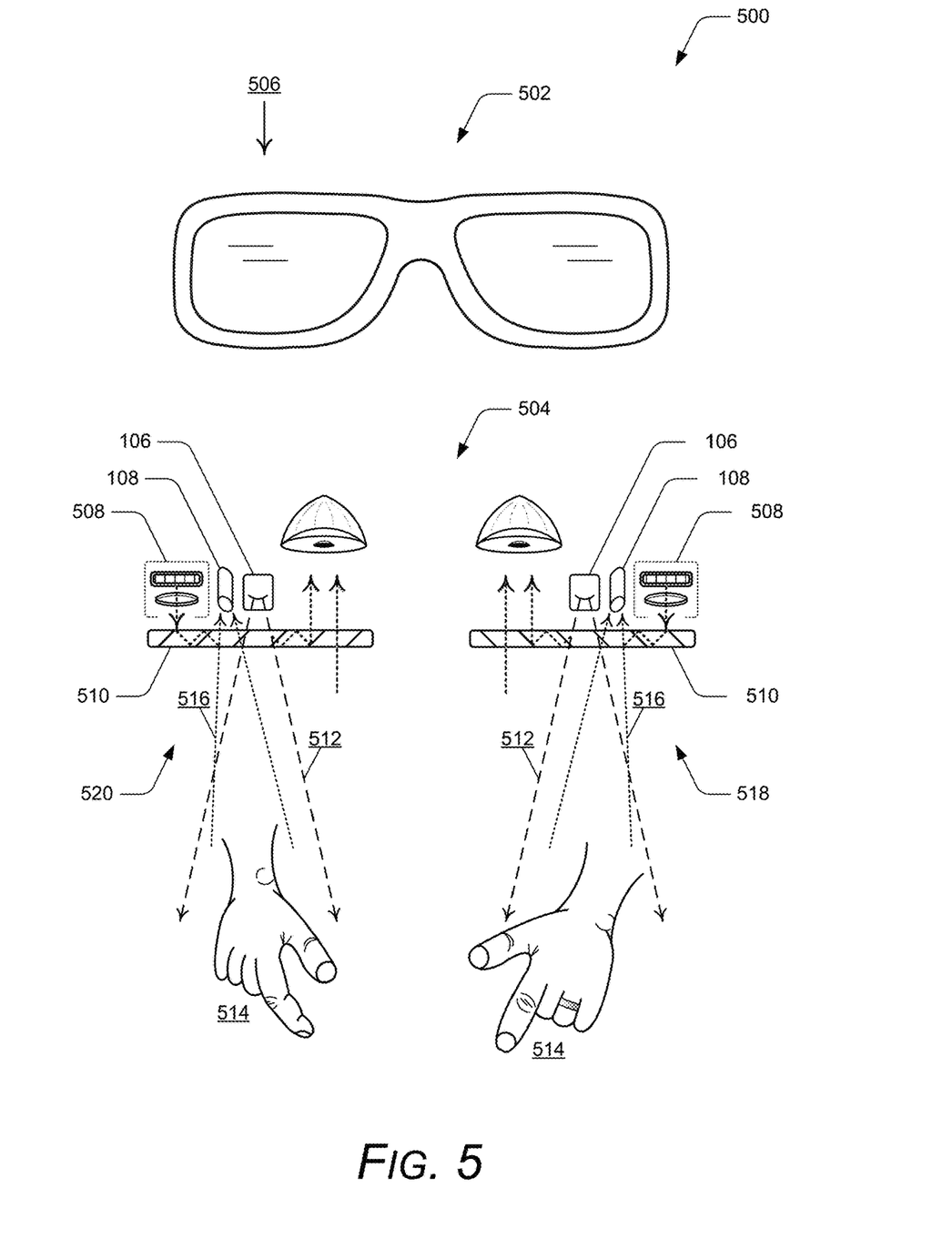
FIG. 5 illustrates an example system that includes examples of imaging units in which embodiments of selective illumination can be implemented.

FIG. 5 illustrates an example system 500 in which various embodiments of selective illumination can be implemented. An example wearable display device 502 includes left and right lens systems 504 that are viewed from a perspective 506 of the wearable display device, as if viewing the lens systems from the top of the device. In embodiments, the lens systems 504 can be implemented as left and right display lens systems of the wearable display device described with reference to FIG. 6. A wearable display device can be implemented as any type of glasses or head-mounted display (HMD) that includes implementations of the left and right lens systems through which a user can view the surrounding environment, yet also see virtual images that are generated for display to appear as a part of the environment. References to a left lens system and a right lens system, as described herein, correlate to a user's left and right eyes (e.g., from the perspective of wearing and looking through the wearable display device). Alternatively, the left and right lens systems may be described from the perspective of looking at the wearable display device.

The lens systems 504 each include an imaging unit 508 that can be implemented with any number of micro display panels, imaging structures with direct emitters, lenses, and reflecting elements to display and project a virtual image into a display optic 510, such as a see-through and reflecting waveguide. The waveguides are display optics implemented for internal reflection that conducts visible light of a virtual image that is generated by the imaging units 508 and projected for viewing by a user. The waveguides also pass through the light from the surrounding environment for viewing by the user (e.g., an image of the environment as viewed through the wearable display device). A lens system 504 with an imaging unit 508 can also be implemented with components of the display lens system described with reference to FIG. 6 to implement embodiments of selective illumination.

In embodiments, the lens systems 504 can each be implemented with the imaging device 102, which includes the illumination system 106 and the imaging system 108 (illustrated as a camera) as described with reference to FIGS. 1-4. The light 512 that is emitted from the illumination system 106 is reflected off of a target 514 (e.g., a user's hand) and the imaging system 108 captures the reflection images 516 of the emitted light. The illumination systems 106 can be implemented to each emit multiple beams of light that diverge to reflect a light pattern. Alternatively or in addition, the illumination systems include collimation optics and/or diffractive optics that disperse the light in a structured pattern. The collimated light is emitted parallel and narrowly disperses over a propagation distance to the point of being reflected from a target 514.

The imaging system 108 of the left lens system 518 captures a first reflection image that includes an image of the left target, and captures a second reflection image that includes an image of the right target. Similarly, the imaging system 108 of the right lens system 520 captures a first reflection image that includes an image of the right target, and captures a second reflection image that includes an image of the left target. The imaging application 104 can then compare the reflection images that are captured by both of the imaging systems 108 to determine target positioning by the stereo imaging. The imaging application can also determine a distance from each of the left and right lens systems 504 to the targets 514 in the environment that reflect structured light patterns, such as from the divergence of the structured light patterns. Alternatively or in addition, the lens systems 504 may include a distance sensor to provide the distance from a lens system to the target in the environment that reflects the light from the illumination systems 106. Although the example wearable display device 502 is described and shown to include two illumination and imaging systems, the wearable display device may be implemented with one illumination system and one imaging system, such as described with reference to FIG. 4.

Figure 6:
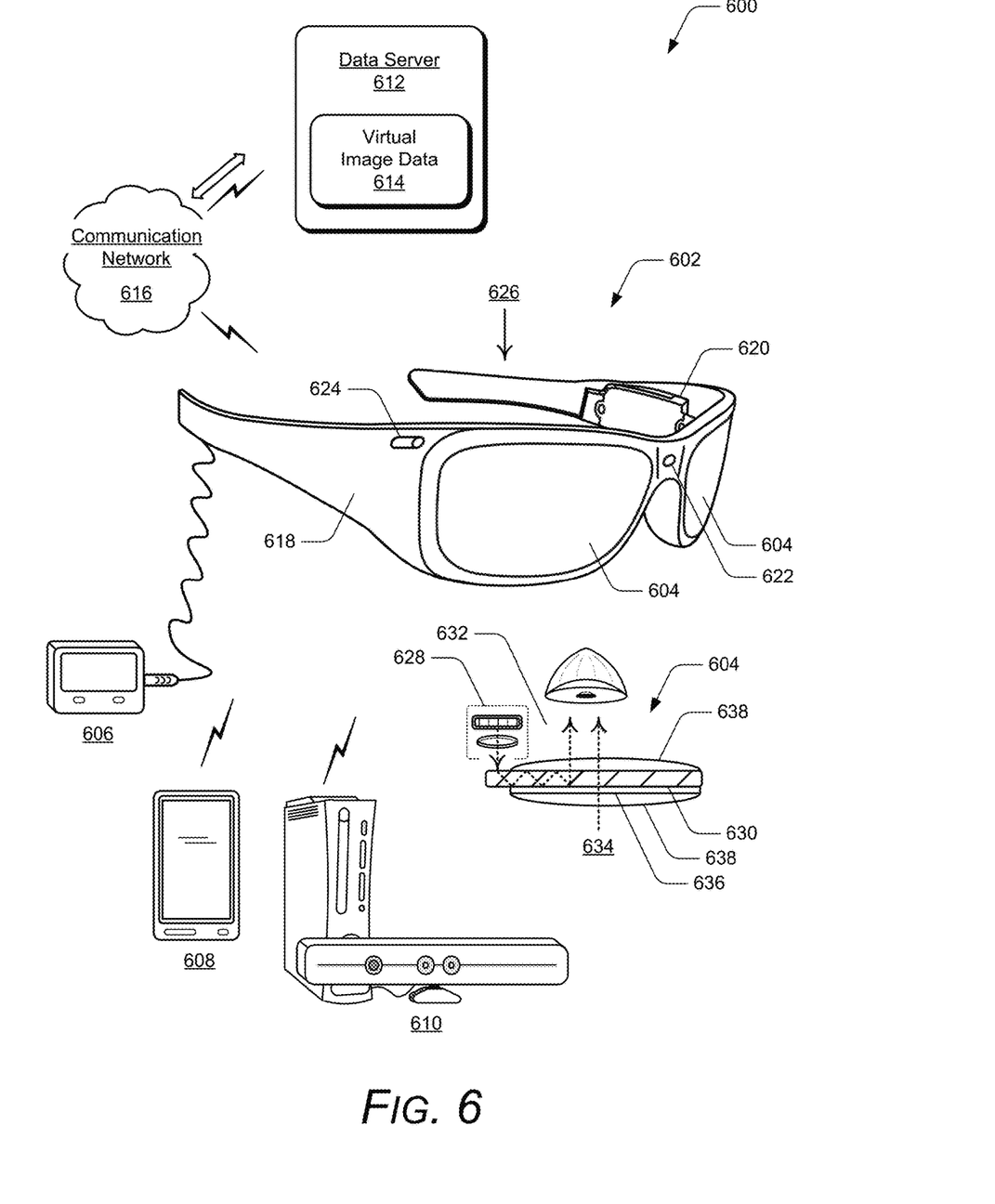
FIG. 6 illustrates an example system that includes an example of a wearable display device in which embodiments of selective illumination can be implemented.

FIG. 6 illustrates an example system 600 that includes an example wearable display device 602 in which embodiments of selective illumination can be implemented. The wearable display device can be implemented as any type of glasses or head-mounted display (HMD) that includes display lens systems 604 (e.g., left and right display lens systems) through which a user can view the surrounding environment, yet also see virtual images (e.g., any type of object, video, text, graphic, and the like) that are generated for display and appear as a part of the environment.

The wearable display device 602 can be implemented as an independent, portable system that includes memory, software, a processor, and/or a power source. Alternatively or in addition, the wearable display device may be communicatively linked to a controller 606 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 9. For example, the controller and/or the wearable display device includes an imaging application implemented as computer-executable instructions, such as a software application, and executed by a processor to implement embodiments of selective illumination as described herein.

In embodiments, the controller may be implemented as a dedicated device (e.g., the wired controller 606), as a mobile phone 608, a tablet or other portable computer device, a gaming system 610, or as any other type of electronic device that can be implemented to process and generate virtual images for display as part of the environment that is viewed through the display lens systems of the wearable display device. The controller can be implemented to communicate with the wearable display device wirelessly via WiFi™, Bluetooth™, infrared (IR), RFID transmission, wireless Universal Serial Bus (WUSB), cellular, or via other wireless communication techniques.

The example system 600 also includes a data server 612, or data service, that communicates, or otherwise distributes, virtual image data 614 to the wearable display device 602 via a communication network 616. For example, the data server may be part of a network-based gaming system that generates virtual images for virtual reality and/or augmented reality display at the wearable display device. Alternatively, the data server may be part of a navigation system that communicates navigation directions and information for display in the display lens systems 604 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 616, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 602 includes a frame 618, such as in the form of glasses, goggles, or any other structure, that supports and incorporates the various components of the device, as well as serves as a conduit for electrical and other component connections. A components module 620 (or components modules on the left, right, and/or both sides of the device frame) incorporates any of the various components, such as processing and control circuitry, memory, software, a processor, GPS transceiver, and/or power source. The wearable display device may also include a microphone 622 to record audio data from the surrounding environment, as well as ear phones for audio feedback as part of an augmented reality experience.

The wearable display device 602 also includes various cameras 624 that capture video and still images of the surrounding environment. The image and video data can be processed on the device and/or by a controller device (e.g., controller 606), and used to create a mapping field to orient and track a user in the environment space. The wearable display device can also include eye-tracking cameras used to determine a user eyeball and/or pupil location, and to track eye movements. The wearable display device may also include a temperature sensor, as well as inertial sensors and/or attitude sensors, including MEMS gyros, magnetic sensors (e.g., a compass), and acceleration sensors for sensing position, orientation, and acceleration of the wearable display device.

An example of one display lens system 604 is shown from a viewer perspective 626 of the wearable display device 602, as if viewing the display lens system from the top of the device. The display lens system includes an imaging unit 628, which can be implemented with any number of micro display panels, lenses, and reflecting elements to display and project a virtual image into a see-through and reflecting waveguide 630. A display lens system 604 can also be implemented as the imaging units described with reference to FIG. 5 that incorporate the imaging device described with reference to FIGS. 1-4 to implement embodiments of selective illumination. The see-through, reflecting waveguides 630 are implemented for internal reflection and conduct the visible light 632 of a virtual image that is generated by the imaging unit for viewing by a user, and also pass through the light 634 from the surrounding environment for viewing by the user.

The micro display panels, lenses, and/or reflecting elements of the imaging unit 628 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging units 628 (or other components of a display lens system 604) can be implemented to include an infra-red (IR) laser utilized for system calibrations and/or as an illumination source for an eye-tracking system and camera that tracks the position of a user's eyes and/or pupils. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. Alternatively or in addition, sensors can be implemented in a CMOS driver array to detect the feedback. The see-through and reflecting waveguides 630 can also be utilized for the infrared illumination, and for eyeball reflections that the eye-tracking system uses to track the position of the user's eyes and/or pupils.

In this example, the display lens systems 604 include an optional opacity filter 636, and a see-through lens 638 on each side of the waveguides 630. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example methods 700 and 800 are described with reference to respective FIG. 7 in accordance with one or more embodiments of selective illumination and FIG. 8 in accordance with one or more embodiments of selective imaging. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 7:
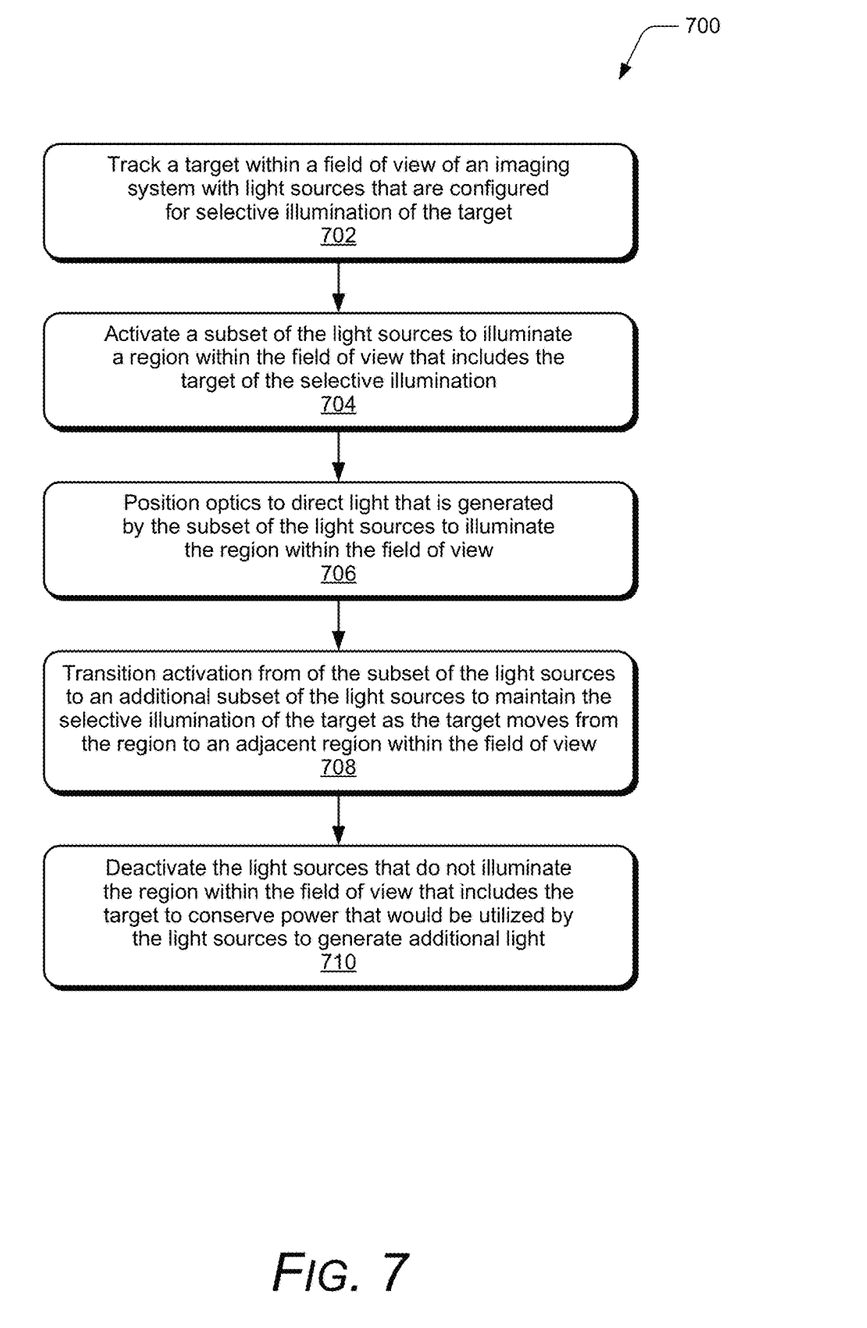
FIG. 7 illustrates example method(s) of selective illumination in accordance with one or more embodiments.

FIG. 7 illustrates example method(s) 700 of selective illumination. The order in which the method blocks are described are not intended to be construed as a limitation, and any number of the described method blocks can be combined in any order to implement a method, or an alternate method.

At block 702, a target within a field of view of an imaging system is tracked with light sources that are configured for selective illumination of the target. For example, the region 122 that includes the target 112 in the field of view 114 is illuminated with a subset 120 of the light sources 110 of the illumination system 106 (as shown in FIG. 1). In embodiments, targets of selective illumination are the hands of a user of a device, such as a gaming device or a wearable display device. The hands of the user can be tracked by the imaging application 104 of a wearable display device, and the light sources of the illumination system 106 illuminate the one or more regions within a field of view with non-visible light that the imaging system 108 detects to track the hands (as shown in FIG. 4).

At block 704, a subset of the light sources are activated to illuminate a region within the field of view that includes the target of the selective illumination. At block 706, optics are positioned to direct light that is generated by the subset of the light sources to illuminate the region within the field of view. For example, the imaging application 104 activates the subset 120 of the light sources 110 and positions the optics 116 to direct the light 118 to illuminate the region 206 within the field of view 204 that initially includes the target 208 of the selective illumination (as shown in FIG. 2). In embodiments, selective illumination can include activating the subset 120 of the light sources 110 at full power to illuminate the target in the region within the field of view. In other embodiments, selective illumination can include activating all of the light sources 110 at less than full power when the target of the selective illumination approximately encompasses the entire field of view at a position near the imaging device. For example, the target may be a hand of a user that wears a head-mounted display device, and the user may move or position his or her hand close to the imaging device, which would, for the most part, encompass the entire field of view.

At block 708, activation of the subset of the light sources is transitioned to an additional subset of the light sources to maintain the selective illumination of the target as the target moves from the region to an adjacent region within the field of view. For example, the imaging application 104 transitions activation from the initial subset 120 of the light sources 110 to an additional subset 210 of the light sources to maintain the selective illumination of the target 208 with light 212 that is directed by the optics 116 as the target moves from the region 206 to an adjacent region 214 within the field of view 204 (as shown in FIG. 2). For transition illumination from one region to another within the field of view, one or more of the light sources 110 are activated as part of the subset 120 and the additional subset 210 of the light sources to maintain the selective illumination as the target 208 moves between the region 206 and the adjacent region 214.

At block 710, the light sources that do not illuminate the region within the field of view that includes the target are deactivated to conserve power that would be utilized by the light sources to generate additional light. For example, the imaging application 104 deactivates (or does not activate) the other light sources 110 that are not part of the subset 120 and that do not illuminate the region 206 within the field of view 204 that includes the target 208 to conserve power that would otherwise be utilized by the light sources to generate additional light.

Figure 8:
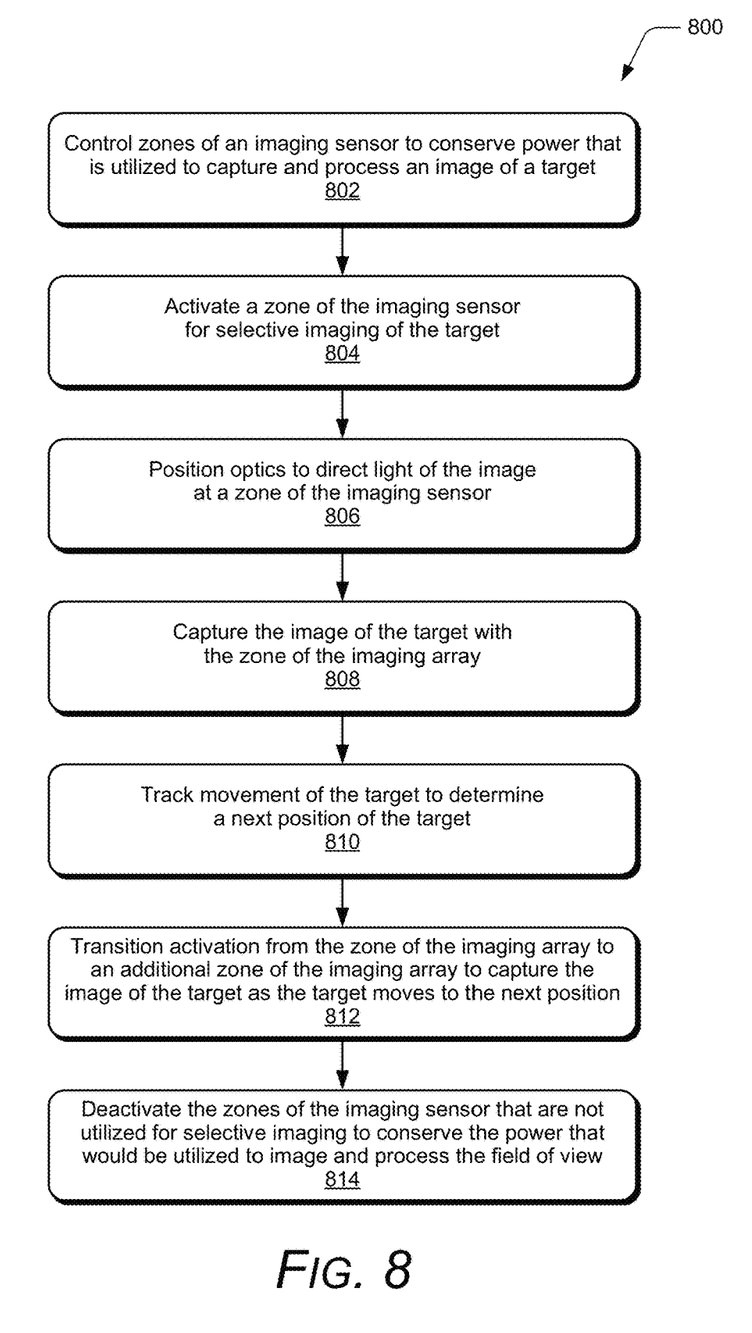
FIG. 8 illustrates example method(s) of selective imaging in accordance with one or more embodiments.

FIG. 8 illustrates example method(s) 800 of selective imaging. The order in which the method blocks are described are not intended to be construed as a limitation, and any number of the described method blocks can be combined in any order to implement a method, or an alternate method.

At block 802, zones of an imaging sensor are controlled to conserve power that is utilized to capture and process an image of a target. For example, the imaging sensor 124 of the imaging system 108 is divided into zones of pixel arrays, and one or more of the zones of the imaging sensor are selectively activated and/or deactivated for selective imaging of the target 112 that is within the field of view 114 of the imaging system (as shown in FIG. 1). Each zone of the imaging sensor corresponds to a different region within the field of view of the imaging system. Alternatively, a zone of the imaging sensor corresponds to more than one region within the field of view of the imaging system.

At block 804, a zone of the imaging sensor is activated for selective imaging of the target, and at block 806, optics are positioned to direct light of the image at a zone of the imaging sensor. At block 808, the image of the target is captured with the zone of the imaging sensor. For example, the imaging application 104 activates the selected zone 130 of the imaging sensor 124 and positions the optics 126 to direct the light 128 to capture the image of the target 304 that is initially positioned in the region 306 within the field of view 308 (as shown in FIG. 3). An image of the target 304 is then captured with the zone 130 of pixel arrays of the imaging sensor 124.

At block 810, movement of the target is tracked to determine a next position of the target. For example, the imaging application 104 tracks movement of the target 304 to determine a next position of the target. The target may be a hand of a user that wears a head-mounted display device, and the hand of the user is tracked by the imaging system of the device. In embodiments, the target hand can be tracked based on eye-tracking data that indicates the user is looking at the next position where the target hand will move.

At block 812, activation of the zone of the imaging sensor is transitioned to an additional zone of the imaging sensor to capture the image of the target as the target moves to the next position. For example, the imaging application 104 transitions activation from the initial zone 130 of the imaging sensor 124 to the additional zone 310 of the imaging sensor, and positions the optics 126 to direct the light 312, to maintain the selective imaging of the target 304 as the target moves from the position in region 306 to the next position in region 314 within the field of view 308 (as shown in FIG. 3).

At block 814, the zones of the imaging sensor that are not utilized for selective imaging are deactivated to conserve the power that would be utilized to image and process the field of view. For example, the imaging application 104 deactivates (or does not activate) the other zones of the imaging sensor 124 that are not utilized for the selective imaging to conserve power that would otherwise be utilized to image and process the full field of view.

Figure 9:
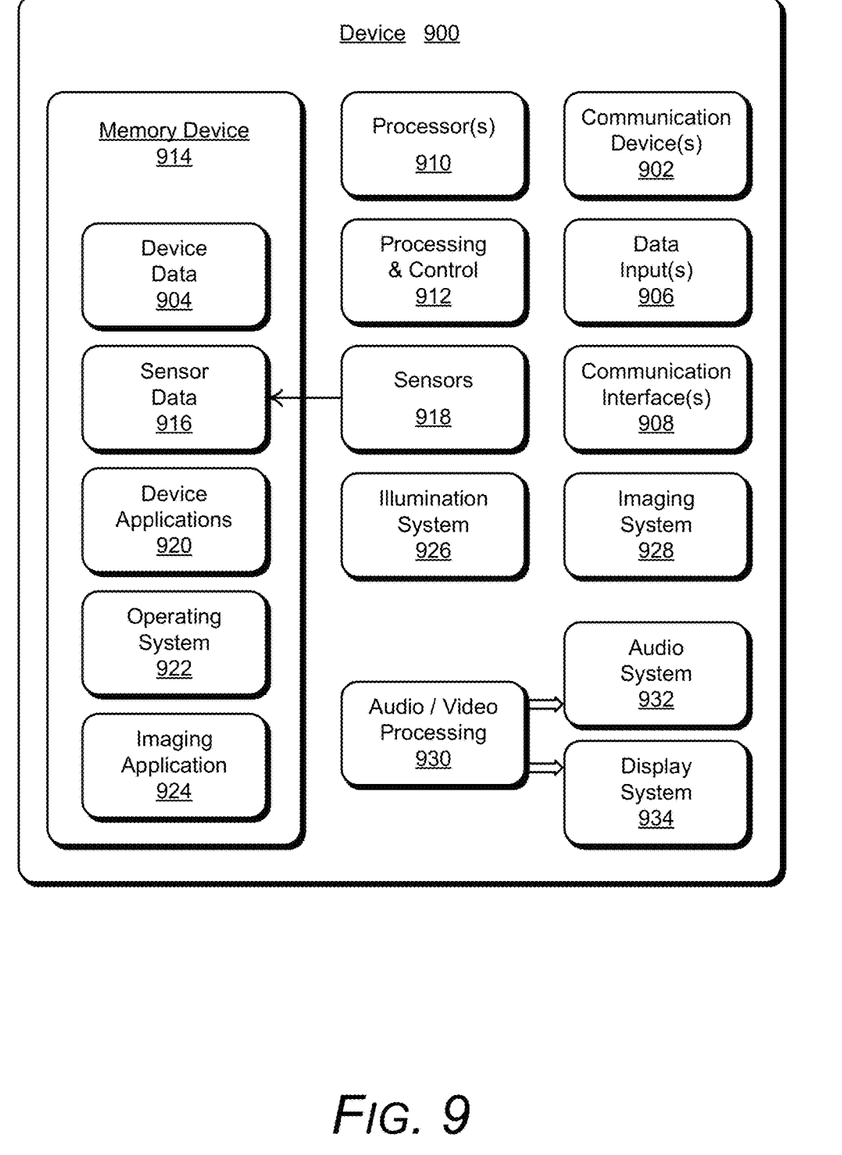
FIG. 9 illustrates various components of an example device that can implement embodiments of selective illumination.

FIG. 9 illustrates various components of an example device 900 that can be implemented as any of the devices described with reference to the previous FIGS. 1-8, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 900 includes communication devices 902 that enable wired and/or wireless communication of device data 904, such as virtual image data, camera imaging data, and other media content (e.g., video and/or images) stored on the device. The media content stored on the device can include any type of audio, video, and/or image data. The device includes one or more data inputs 906 via which any type of data, media content, and/or inputs can be received, such as user-selectable inputs and any other type of audio, video, and/or image data received from any content and/or data source. The data inputs 906 may include USB ports, coaxial cable, and other serial or parallel connectors (including internal connectors) for flash memory, DVDs, CDs, and the like. The data inputs can be used to couple the device to components, peripherals, and accessories, such as keyboards, microphones, cameras, and any other type of input devices.

The device 900 also includes communication interfaces 908, such as any one or more of a serial, parallel, network, or wireless interface. The communication interfaces provide a connection and/or communication links between the device and a communication network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 900 includes one or more processors 910 (e.g., any of microprocessors, controllers, and the like), or a processor and memory system (e.g., implemented in an SoC), which process computer-executable instructions to control the operation of the device. Alternatively or in addition, the device can be implemented with any one or combination of software, hardware, firmware, or fixed logic circuitry that is implemented in connection with processing and control circuits which are generally identified at 912.

The device 900 also includes one or more memory devices 914 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 914 provides data storage mechanisms to store the device data 904 (e.g., imaging system data), sensor data 916 from sensors 918 and other data input devices, such as cameras, other types of information and/or data, and device applications 920. For example, an operating system 922 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 924 that controls an illumination system 926 and an imaging system 928 in embodiments of selective illumination as described herein. Examples of the imaging application 924, the illumination system 926, and the imaging system 928 are described with reference to the imaging application 104, the illumination system 106, and the imaging system 108 shown in FIGS. 1-4.

The device 900 may also include an audio and/or video processing system 930 that generates audio data for an audio system 932 and/or generates display data for a display system 934. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although embodiments of selective illumination have been described in language specific to features and/or methods, the appended claims are not necessarily limited to the specific features or methods described. Rather, the specific features and methods are disclosed as example implementations of selective illumination.

The invention claimed is:

1. An illumination system, comprising:
light sources configured to generate and emit light;
optics configured for positioning to direct the light to illuminate a region within a field of view;
an imaging application configured to:
    activate an imaging system to capture a reflection image of a target from the light that reflects off of the target;
    activate a first subset of the light sources for selective illumination of the target responsive to a determination of a position of the target based on the captured reflection image;
    transition from the first subset of the light sources to a second subset of the light sources to maintain the selective illumination of the target; and
    position the optics to illuminate the region within the field of view that includes the target of the selective illumination.

2. An illumination system as recited in claim 1, wherein the imaging application is further configured to deactivate the first subset of the light sources or the second subset of the light sources that do not illuminate the region within the field of view that includes the target to conserve power utilized by the light sources to generate the light.

3. An illumination system as recited in claim 1, wherein the imaging application is configured to one of:
    activate all of the light sources at less than full power when the target of the selective illumination approximately encompasses the field of view at a position near the imaging system; or
    activate the first or second subset of the light sources at the full power when the target of the selective illumination is positioned in the region within the field of view away from the imaging system.

4. An illumination system as recited in claim 1, wherein the imaging application is configured to initiate the transition activation from the first subset of the light sources to the second subset of the light sources to maintain the selective illumination of the target as the target moves from the region to an adjacent region within the field of view.

5. An illumination system as recited in claim 4, wherein:
the region and the adjacent region within the field of view at least partially overlap; and
the imaging application is configured to activate one or more of the light sources as part of the first subset and the second subset of the light sources to maintain the selective illumination as the target moves between the partially overlapping region and adjacent region.

6. An illumination system as recited in claim 1, wherein the light sources comprise one of an array of light emitting diodes (LEDs), an array of lasers, or a vertical cavity surface emitting laser (VCSEL) array.

7. An illumination system as recited in claim 1, wherein the optics comprise one of a micro-electro-mechanical (MEMs) scanning mirror, a liquid crystal (LC) optic, or a Switchable Bragg Grating (SBG).

8. A method, comprising:
activating an imaging system to capture a reflection image of a target from light emitted from light sources that reflects off of a target within a field of view of the imaging system;
activating a subset of the light sources responsive to determining a position of the target based on the captured reflection image, the subset of the light sources activated to illuminate a region within the field of view that includes the target of the selective illumination;
tracking the target within the field of view based on subsequent reflection images; and
transitioning activation from the subset of the light sources to an additional subset of the light sources to maintain the selective illumination of the target as the target moves from the region to an adjacent region within the field of view.

9. A method as recited in claim 8, further comprising positioning optics to direct light that is generated by the subset of the light sources to illuminate the region within the field of view.

10. A method as recited in claim 8, further comprising deactivating the light sources that do not illuminate the region within the field of view that includes the target to conserve power utilized by the light sources to generate light.

11. A method as recited in claim 8, further comprising activating one or more of the light sources as part of the subset and the additional subset of the light sources to maintain the selective illumination as the target moves between the region and the adjacent region.

12. A method as recited in claim 8, further comprising activating all of the light sources at less than full power when the target of the selective illumination approximately encompasses the field of view at a position near the imaging system.

13. A method as recited in claim 12, wherein the subset of the light sources are activated at the full power when the target of the selective illumination is positioned in the region within the field of view of the imaging system.

14. A method as recited in claim 8, wherein:
the target is a hand of a user that is tracked by the imaging system of a wearable display device; and
the light sources illuminate the region within the field of view with non-visible light that the imaging system detects to track the hand.

15. A wearable display device, comprising:
an imaging system configured to image hands of a user of the wearable display device;
light sources configured to generate and emit light;
optics configured for positioning to direct light to illuminate one or more regions within the field of view;
an imaging application configured to:
activate an imaging system to capture reflection images of the hands from the light that reflects off of the hands;
activate the subset of the light sources for selective illumination of the hands responsive to a determination of positions of the hands based on the captured reflection images; and
position the optics to illuminate the one or more regions within the field of view that includes the hands of the user for the selective illumination.

16. A wearable display device as recited in claim 15, wherein the imaging application is further configured to:
activate a first subset of the light sources to illuminate a first region within the field of view for selective illumination of a right hand of the user; and
activate a second subset of the light sources to illuminate a second region within the field of view for selective illumination of a left hand of the user.

17. A wearable display device as recited in claim 15, wherein the imaging application is further configured to deactivate the light sources that do not illuminate the one or more regions within the field of view that includes the hands to conserve power utilized by the light sources to generate the light.

18. A wearable display device as recited in claim 15, wherein the imaging application is further configured to:
activate all of the light sources at less than full power when a hand approximately encompasses the field of view at a position near the imaging system; or
activate the subset of the light sources at the full power when the hand is positioned in a region within the field of view of the imaging system.

19. A wearable display device as recited in claim 15, wherein the imaging application is configured to transition activation from the subset of the light sources to an additional subset of the light sources to maintain the selective illumination of a hand as the hand moves from a region to an adjacent region within the field of view.

20. A wearable display device as recited in claim 19, wherein:
the region and the adjacent region within the field of view at least partially overlap; and
the imaging application is configured to activate one or more of the light sources as part of the subset and the additional subset of the light sources to maintain the selective illumination as the hand moves between the partially overlapping region and adjacent region.

* * * * *